(12) United States Patent
Malin et al.

(10) Patent No.: US 12,533,330 B2
(45) Date of Patent: Jan. 27, 2026

(54) (2S)-2-AMINOPENTANETHIOIC S-ACID FOR USE AS MEDICAMENT AND IN THERAPY OF AMYOTROPHIC LATERAL SCLEROSIS

(71) Applicant: MASSEY VENTURES LIMITED, Palmerston North (NZ)

(72) Inventors: Alexander Alexandrovich Malin, Netania (IL); Igor Anatolievich Pomytkin, Moscow (RU)

(73) Assignee: MASSEY VENTURES LIMITED, Palmerston North (NZ)

( * ) Notice: Subject to any disclaimer, the term of this patent is extended or adjusted under 35 U.S.C. 154(b) by 421 days.

(21) Appl. No.: 18/258,514

(22) PCT Filed: Dec. 4, 2020

(86) PCT No.: PCT/RU2020/000661
§ 371 (c)(1),
(2) Date: Jun. 20, 2023

(87) PCT Pub. No.: WO2022/119470
PCT Pub. Date: Jun. 9, 2022

(65) Prior Publication Data
US 2024/0058285 A1    Feb. 22, 2024

(51) Int. Cl.
*A61K 31/185* (2006.01)
*A61P 25/14* (2006.01)
*A61P 25/28* (2006.01)

(52) U.S. Cl.
CPC ............ *A61K 31/185* (2013.01); *A61P 25/28* (2018.01)

(58) Field of Classification Search
CPC .. A61K 31/185; A61K 31/095; C07C 327/22; C07C 327/06; A61P 25/14; A61P 25/28
See application file for complete search history.

(56) References Cited

U.S. PATENT DOCUMENTS
4,169,834 A    10/1979    Cricchio

FOREIGN PATENT DOCUMENTS
WO    2014011624 A2    1/2014
WO    2022119470 A1    6/2022

OTHER PUBLICATIONS

International Search Report and Written Opinion for International Application No. PCT/RU2020/000661, dated Sep. 20, 2021, 9 pages.
International Preliminary Report on Patentability for International Application No. PCT/RU2020/000661, dated May 30, 2023, 7 pages.

*Primary Examiner* — Irina Neagu
(74) *Attorney, Agent, or Firm* — Ryan L. Marshall; Barnes & Thornburg LLP

(57) ABSTRACT

The present invention relates to a substance of formula (I) or a pharmaceutically acceptable salt thereof for use as a medicament. Further, the invention relates to the substance of formula (I) for use in the therapy of amyotrophic lateral sclerosis. Still further, the invention relates to a method of treating amyotrophic lateral sclerosis comprising administering to a subject in need thereof an effective amount of the substance of formula (I) or a pharmaceutically acceptable salt thereof.

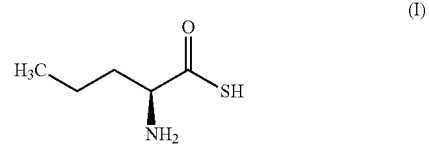

(I)

17 Claims, 3 Drawing Sheets

(2S)-2-AMINOPENTANETHIOIC S-ACID FOR USE AS MEDICAMENT AND IN THERAPY OF AMYOTROPHIC LATERAL SCLEROSIS

CROSS-REFERENCE TO RELATED APPLICATIONS

This application is a National Stage application of International Application No. PCT/RU2020/000661 filed Dec. 4, 2020, the entire contents of this application is hereby incorporated by reference herein.

FIELD OF THE INVENTION

The present invention relates to (2S)-2-aminopentanethioic S-acid or a pharmaceutically acceptable salt thereof for use as a medicament and in the therapy of amyotrophic lateral sclerosis.

BACKGROUND OF THE INVENTION

2-Aminopentanethioic S-acid, having a chemical formula $CH_3CH_2CH_2CH(NH_2)C(O)SH$, is known from the art as a chemical reagent that has been used in the synthesis of organic antibiotics. Cricchio R et al., *Eur. J. Med. Chem.— Chimica Therapeutica*, 1981, 16(4):301-306. Due to the presence of chiral carbon, 2-aminopentanethioic S-acid may exist as individual enantiomers (2S)-2-aminopentanethioic S-acid and (2R)-2-aminopentanethioic S-acid, or a racemic mixture thereof. It should be noted that (S)- or (R)-configuration of the substance has not been specified by Cricchio et al. in the above publication. The database SciFinder contains mentioning about (S)-configuration of 2-aminopentanethioic S-acid based on citing the original publication of Cricchio et al. (1981). But such the mention is an incorrect citation and an error in the database, since the original publication of Cricchio et al. (1981) does not indicate any configuration of 2-aminopentanethioic S-acid or a configuration raw materials used for preparing 2-aminopentanethioic S-acid. Therefore, individual (S)- and (R)-enantiomers of 2-aminopentanethioic S-acid have never been disclosed in the art. In addition, nothing is known from the art about biological properties of 2-aminopentanethioic S-acid per se, or its individual enantiomers or racemic mixture thereof. Nothing is known from the art about the use of (2S)-2-aminopentanethioic S-acid taken either as the individual substance or as component of the racemic mixture in medicine.

Amyotrophic lateral sclerosis (ALS) is a neurodegenerative disease characterized by progressive degeneration of lower motor neurons, as well as neurons in the cortex and brainstem, which leads to paralysis and premature death. Al-Chalabi A et al. *Amyotrophic lateral sclerosis: moving towards a new classification system. Lancet Neurol.* 2016; 15:1182-1194. The etiology of ALS remains unclear both in the familial forms and sporadic cases of ALS. Among the known genetic causes that give rise to ALS, the mutation of the fused in sarcoma protein (FUS) is the second most frequent among the familial forms of ALS. Blair I P et al. *FUS mutations in amyotrophic lateral sclerosis: clinical, pathological, neurophysiological and genetic analysis. J Neurol Neurosurg Psychiatry.* 2010; 81:639-645. Current ALS treatments can slow the progression of symptoms and prevent complications but cannot reverse the neuronal cells damage. The Food and Drug Administration has approved two drugs for treating ALS. The first one, the oral drug Riluzole (Rilutek) has been shown to increase life expectancy by three to six months. The second one, the intravenous drug Edaravone (Radicava) has been shown to reduce the decline in daily functioning, while its effect on life span is not yet known. Thus, there is the critical unmet medical need for new, effective treatments for ALS.

Nothing is known from the art about (2S)-2-Aminopentanethioic S-acid for use in the treatment of ALS.

SUMMARY OF THE INVENTION

A first aspect of the invention relates to a substance of formula (I):

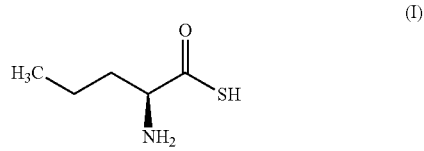

or a pharmaceutically acceptable salt thereof for use as a medicament.

According to another aspect, the invention relates to a substance of formula (I):

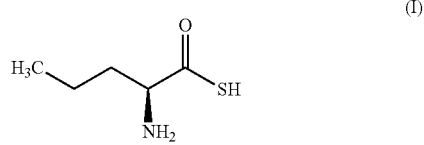

or a pharmaceutically acceptable salt thereof for use in the therapy of amyotrophic lateral sclerosis.

According to another aspect, the invention relates to a method of treating amyotrophic lateral sclerosis comprising administering to a subject in need thereof an effective amount of a substance of formula (I):

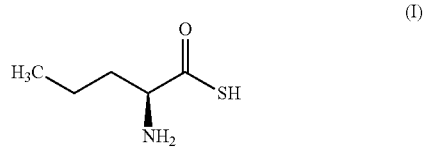

or a pharmaceutically acceptable salt thereof.

DETAILED DESCRIPTION OF THE INVENTION

Figure 1:
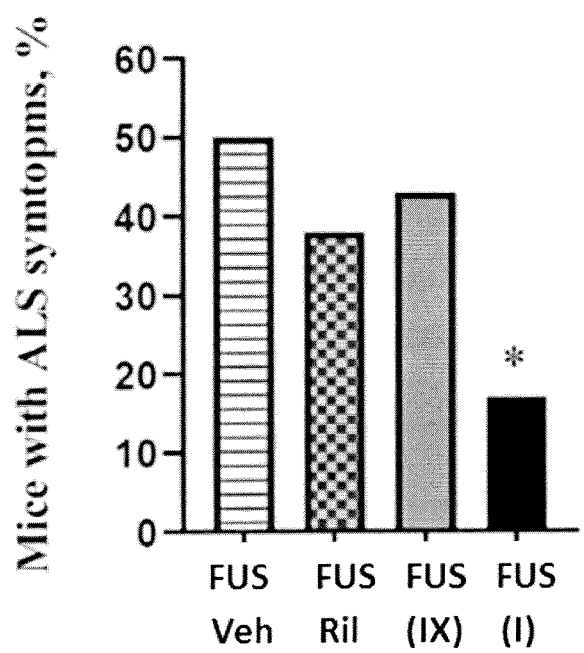
FIG. 1 shows the effects of chronic administration of the substance of formula (I) as well as Vehicle (Veh), Riluzole (Ril), and the substance of formula (IX) on the occurrence of ALS motor symptoms in FUS-tg mice (FUS), specifically on percentage of mice having signs of paralysis on the 95th day (*$p<0.05$ vs. Veh, Fisher test).

All terms and definitions explained throughout the text of specification of the invention relate to all aspects and embodiments of the invention, unless otherwise specified.

A first aspect of the invention relates to a substance of formula (I):

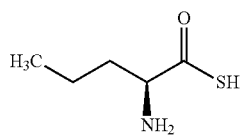

(I)

or a pharmaceutically acceptable salt thereof for use as a medicament.

The substance of formula (I) has a chemical name (2S)-2-aminopentanethioic S-acid and a chemical formula $C_5H_{11}NOS$.

The present invention relates to all tautomeric forms of the substance of formula (I), including S-acid form (I), O-acid form (II), inner salt form (III), and pharmaceutically acceptable salts thereof prepared by reaction with an appropriate acid, where X is an anion (IV), or by reaction with an appropriate base, where Y is a cation (V):

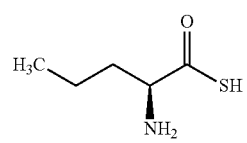

(I)

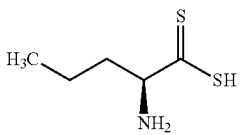

((II)

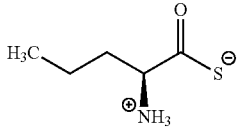

(III)

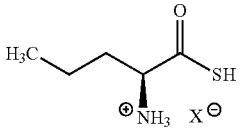

(IV)

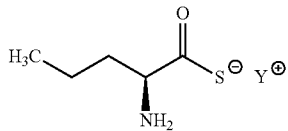

(V)

wherein non-exclusive examples of X include chloride, bromide, sulfate, phosphate, mesylate, acetate, pyruvate, lactate, citrate, succinate, fumarate, malate, and ketoglutarate; and wherein non-exclusive examples of Y include lithium, sodium, potassium, magnesium, calcium, ammonium, and an alkylammonium.

The present invention relates to all hydrates, solvates, and isotopologues of the substance of formula (I).

The term "isotopologue", as used herein, refers to molecules that differ only in their isotopic composition. Non-exclusive examples of isotopes are $^1H$ and $^2H$ isotopes of hydrogen, $^{11}C$, $^{12}C$, $^{13}C$, and $^{14}C$ isotopes of carbon, $^{15}O$, $^{16}O$, $^{17}O$, and $^{18}O$ isotopes of oxygen, $^{13}N$, $^{14}N$, and $^{15}N$ isotopes of nitrogen, and $^{32}S$, $^{33}S$, $^{34}S$, and $^{36}S$ isotopes of sulfur.

The present invention relates to all prodrugs of the substance of formula (I). The term "prodrug", as used herein, refers to a substance that being administered to a subject in need thereof, will result in a therapeutic effect through the intermediate formation of the substance of formula (I).

The term "medicament", as used herein, refers to both, human medicines and veterinary medicines.

According to another aspect, the invention relates to a substance of formula (I):

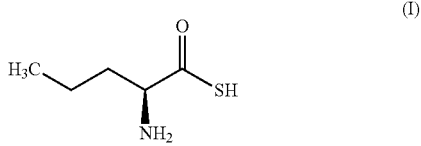

(I)

or a pharmaceutically acceptable salt thereof for use in the therapy of amyotrophic lateral sclerosis.

The term "amyotrophic lateral sclerosis", as used herein, refers to the neurodegenerative neuromuscular disease classified in the International Classification of Diseases, Tenth Revision (ICD-10-CM), under the code G12.21.

The term "therapy", as used herein, refers to any treatment which is designed to cure, alleviate, remove or lessen the symptoms of, or prevent or reduce the possibility of malfunction of the subject body.

According to another aspect, the invention relates to a method of treating amyotrophic lateral sclerosis comprising administering to a subject in need thereof an effective amount of a substance of formula (I):

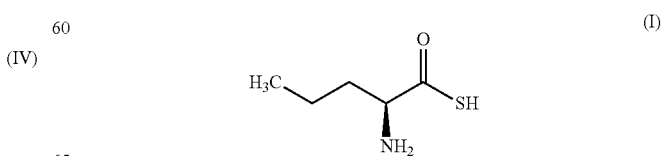

(I)

or a pharmaceutically acceptable salt thereof.

The term "treating" or "treatment" refers to the administration of a medicament to a patient to cure, alleviate, remove or lessen the symptoms of, or prevent or reduce the possibility of malfunction of the subject body.

In practicing the invention, the substance of formula (I) can be administered by different routes, e.g. orally, parenterally, by inhalation spray, buccally, sublingually, nasally, rectally, or parenterally, with oral route being preferred. The term "parenteral", as used herein, includes subcutaneous, intracutaneous, intravenous, intramuscular, intrathecal, intralesional and intracranial injection or infusion techniques.

The term "an effective amount", as used herein, refers to the amount of the active agent that is required to confer the intended therapeutic effect in the subject. Effective amounts may vary, as recognized by those skilled in the art, depending on route of administration, excipient usage, medical conditions, and the possibility of co-usage with other agents.

In practicing the invention, the effective amounts of the substance of formula (I) or a pharmaceutically acceptable salt thereof may vary from 0.1 to 100 mg per kg body weight of the subject.

The term "subject", as used herein, refers to a mammal, preferably human.

In practicing the method of the invention, the effective amounts of the substance of formula (I) or a pharmaceutically acceptable salt thereof can be administered to the same subject one time or multiple times.

In practicing the method of the invention, the effective amounts of the substance of formula (I) or a pharmaceutically acceptable salt thereof can be administered to the same subject for one day or longer.

In practicing the invention, the substance of formula (I) or a pharmaceutically acceptable salt thereof can be administered as an active pharmaceutical ingredient of a pharmaceutical composition. In some embodiments, the composition can contain from 0.01 to 99.99 percent of the substance of formula (I). These compositions can contain some optional ingredients. Such optional ingredients generally are used individually at levels from about 0.01 to about 99.99 percent by weight of the composition. Examples of suitable optional ingredients include, but are not limited to, excipients, carriers, minerals, carbohydrates, lipids, vitamins, co-factors, buffers, flavors and sweeteners, inorganic salts, cations and anions, taste modifying and/or masking agents, amino acids, organic acids, antioxidants, preservatives, colorants, and other suitable ingredients.

In some embodiments, the compositions can be formulated in different dosage forms. Nonexclusive examples of such forms include an orally acceptable dosage form, an injectable dosage form, an inhalation and an intranasal dosage forms, and a rectal dosage form.

The oral composition can be any orally acceptable dosage form including, but not limited to, capsules, tablets, powders, aqueous solutions, suspensions, emulsions, and dispersions. Non-exclusive examples of carriers for tablets include lactose and corn starch. Non-exclusive examples of lubricating agents include magnesium stearate. Non-exclusive examples of diluents for oral administration in a capsule form include lactose and dried corn starch. When aqueous suspensions or emulsions are administered orally, the active ingredient can be suspended or dissolved in an oily phase combined with suspending or emulsifying agents.

The sterile injectable composition can be any acceptable dosage form including, but not limited to, a sterile injectable solution or suspension in a parenterally acceptable diluent or solvent, for example, as a solution in pharmaceutical water, propylene glycol, mannitol, Ringer's solution, isotonic sodium chloride solution. In addition, sterile oils such as synthetic mono- or diglycerides, fatty acids, such as oleic acid and its glyceride derivatives, can be conventionally used as a solvent or suspending medium. Such oil solutions or suspensions can also contain a long-chain alcohol or carboxymethyl cellulose as a diluent or dispersant.

The inhalation and intranasal composition can be any acceptable dosage form including, but not limited to, solutions and dispersions in water or saline that may contain suitable preservatives, absorption promoters to enhance bioavailability, and/or other solubilizing agents known in the art.

The rectal composition can be prepared according to procedures well known in the art in form of suppositories comprising the active ingredient and base capable to be melted or dissolved at a human body temperature to release the active ingredient. Non-exclusive examples of such bases include cacao butter, polyethylene glycol, and synthetic esters of glycerol like Witepsol bases.

In practicing the present invention, the composition of the invention can be prepared by procedures well-known from the art. Such procedures include, but are not limited to, mixing the substance of formula (I) or a pharmaceutical salt thereof with other ingredients of the composition in conventional manner. Guidance for the preparation of compositions of the invention can be found in "*Remington: The science and practice of pharmacy*" 20*th ed*. Mack Publishing, Easton PA, 2000 ISBN 0-912734-04-3 and "*Encyclopaedia of Pharmaceutical Technology*", edited by Swarbrick, J. & J. C. Boylan, Marcel Dekker, Inc., New York, 1988 ISBN 0-8247-2800-9 or a newer edition.

In practicing the invention, the substance of formula (I) can be prepared as described in Cricchio R et al., *Eur. J. Med. Chem.—Chimica Therapeutica*, 1981, 16(4):301-306, starting from (2S)-enantiomer of 2-aminopentanoic acid.

Also, the substance of formula (I) can be prepared according to the process shown in the scheme below, starting from the boc-derivative of (2S)-2-aminopentanoic acid (VI):

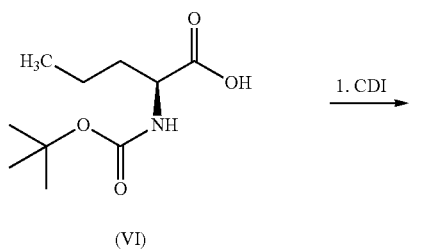

(VI)

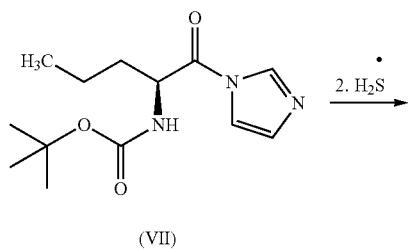

(VII)

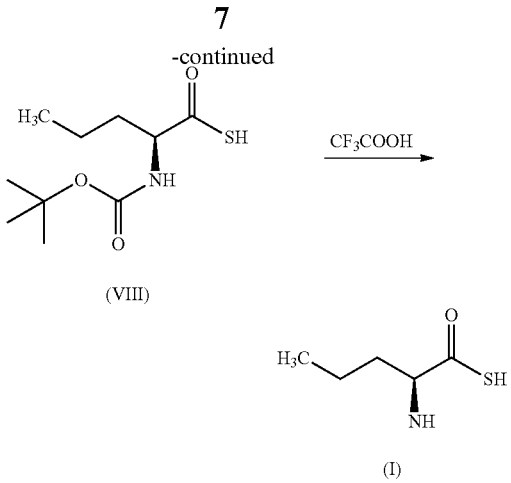

(VIII)

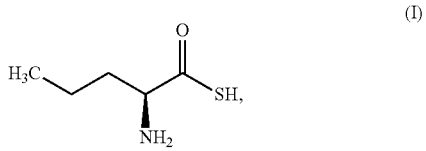

(I)

In the first step, N-(tert-butoxycarbonyl)-(2S)-2-aminopentanoic acid (VI) is reacted with carbonyl diimidazole (CDI) in a suitable solvent, for example methylene chloride, at a temperature of 0-4° C. In the second step, substance (VII) is treated with hydrogen sulfide or a salt thereof, such as sodium hydrogen sulfide, at a temperature of 0-20° C. to obtain N-(tert-butoxycarbonyl)-(2S)-2-aminopentanethioic S-acid (VIII), which deprotection with trifluoroacetic acid results in the substance of formula (I).

In one embodiment of the invention, the substance of formula (VIII) can be used as a prodrug of the substance of formula (I).

The following examples are presented to demonstrate the invention. The examples are illustrative only and are not intended to limit the scope of the invention in any way.

Example 1

This example illustrates a process for preparing (2S)-2-aminopentanethioic S-acid, the substance of formula (I).

Carbonyl diimidazole (7.96 g; 49.12 mmol; CDI) was added to a solution of N-(tert-butoxycarbonyl)-(2S)-2-aminopentanoic acid (9.69 g; 44.65 mmol; Sigma-Aldrich 15556) (VI) in methylene chloride (60 ml) with stirring and cooling in an ice bath to produce the substance (VII). Then, the mixture was stirred for 1 hour at room temperature, and an excessive amount of $H_2S$ was passed into the resulting solution for 3 hours while stirring and cooling in an ice bath. At the end, 15 ml of 1M aqueous HCl was added, the mixture was concentrated under reduced pressure, diluted with ethyl acetate and cooled to 0° C., and adjusted to pH 3. The organic layer was separated, washed with aqueous NaCl, dried with $MgSO_4$, filtered and concentrated under reduced pressure. Then, trifluoroacetic acid (20 ml, 262 mmol) was added to the resulting solution of N-(tert-butoxycarbonyl)-(2S)-2-aminopentanethioic S-acid (VIII), stirred at room temperature, and concentrated under reduced pressure. The white solid was filtered and dried to provide (2S)-2-aminopentanethioic acid (I), the substance of formula (I):

(I)

yield 47% based on the starting N-(tert-butoxycarbonyl)-(2S)-2-aminopentanoic acid (VI). (2S)-2-Aminopentanethioic S-acid (I): $^1$H NMR (DMSO-d6), δ-scale: 0.82 (3H, t); 1.30 (2H, m); 1.61 (1H, m); 1.81 (1H, m); 3.42 (1H, m); 7.74 (3H, br s). Elemental analysis for $C_5H_{11}NOS$ (molecular weight 133.21): calculated (%) C, 45.08; H, 8.32; N, 10.51; S, 24.07; found (%) C, 44.86; H, 8.19; N, 10.46; S, 23.90.

Example 2

This example illustrates a process for preparing (2R)-2-aminopentanethioic S-acid, the substance of formula (IX).

Carbonyl diimidazole (4.00 g; 24.60 mmol; CDI) was added to a solution of N-(tert-butoxycarbonyl)-(2R)-2-aminopentanoic acid (4.85 g; 22.33 mmol; Sigma-Aldrich 12688) in methylene chloride (30 ml) with stirring and cooling in an ice bath. The mixture was stirred for 1 hour at room temperature and an excessive amount of $H_2S$ was passed into the resulting solution for 3 hours while stirring and cooling in an ice bath. At the end, 7 ml of 1M aqueous HCl was added, the mixture was concentrated under reduced pressure, diluted with ethyl acetate and cooled to 0° C., then adjusted to pH 3. The organic layer was separated, washed with NaCl water solution, dried with $MgSO_4$, filtered and concentrated under reduced pressure. Next, trifluoroacetic acid (10 ml, 131 mmol) was added to the resulting solution of N-(tert-butoxycarbonyl)-(2R)-2-aminopentanethioic acid, stirred at room temperature, and concentrated under reduced pressure. The white solid was filtered and dried to provide (2R)-2-aminopentanethioic S-acid (IX) the substance of formula (IX):

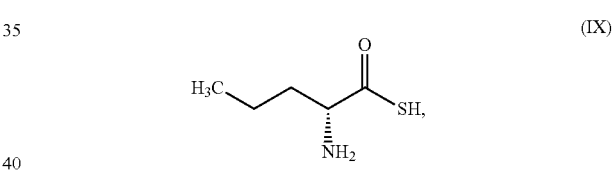

(IX)

yield 39% based on the starting N-(tert-butoxycarbonyl)-(2R)-2-aminopentanoic acid. (2R)-2-Aminopentanethioic S-acid (IX): $^1$H NMR (DMSO-d6), δ-scale: 0.81 (3H, t); 1.29 (2H, m); 1.60 (1H, m); 1.80 (1H, m); 3.42 (1H, m); 7.72 (3H, br s). Elemental analysis for $C_5H_{11}NOS$ (molecular weight 133.21): calculated (%) C, 45.08; H, 8.32; N, 10.51; S, 24.07; found (%) C, 44.89; H, 8.25; N, 10.42; S, 23.91.

Example 3

This example illustrates substance of formula (I) for use in the method of treating amyotrophic lateral sclerosis.

A transgenic FUS[1-359]-tg mouse line (FUS-tg) was used to test the efficacy of the substance of formula (I) in the therapy of amyotrophic lateral sclerosis according to the guidelines set for ALS preclinical studies. Ludolph A C et al. *Guidelines for preclinical animal research in ALS/MND: A consensus meeting. Amyotroph Lateral Scler.* 2010; 11:38-45. Mutations in DNA/RNA-binding factor (fused-in-sarcoma) FUS cause ALS in humans. The FUS-tg mouse model recapitulates core hallmarks of human ALS in the spinal cord, including neuroinflammation and neurodegeneration, ensuing muscle atrophy and paralysis. Shelkovnikova T A et al. *Fused in sarcoma (FUS) protein lacking nuclear localization signal (NLS) and major RNA binding motifs triggers proteinopathy and severe motor phenotype in transgenic* mice. *J Biol Chem.* 2013; 288:25266-25274. Lutz C. *Mouse models of ALS: Past, present and future. Brain Res.* 2018; 1693:1-10. de Munter J et al. *Neuro-Cells therapy improves motor outcomes and suppresses inflammation during experimental syndrome of amyotrophic lateral sclerosis in mice. CNS Neurosci Ther.* 2020; 26(5):504-517.

At the age of nine weeks, FUS-tg male mice or their wild type littermates (WT) start to receive either vehicle, or the substance of formula (I) (50 mg/kg/day), or the substance of formula (IX) (50 mg/kg/day) as a substance of comparison, or the reference anti-ALS drug Riluzole (8 mg/kg) for six weeks, via drinking water. The substance (I) and the substance (IX) represent (2S)- and (2R)-enantiomers of 2-aminopentanethioic S-acid, respectively. The (2R)-enantiomer (IX) was included to the study to clarify importance of (S)- and (R)-configurations of 2-aminopentanethioic S-acid during the therapy of ALS.

The onset of paralysis, a core ALS symptom, was recorded for each FUS-tg mouse. The percentage of FUS-tg mice with signs of paralysis on day 95 was found to be 49% in the vehicle group, 38% in the Riluzole group, 43% in the substance (IX) group, and 16% in the substance (I) group (FIG. 1). The percentage of mice with signs of paralysis on the 95th day was significantly lower in FUS-tg mice treated with the substance of formula (I) in comparison with FUS-tg mice that received vehicle (p<0.05, Fisher test). At this time point, no other treatment has produced a significant effect on this measure. This result indicates that (2S)-configuration of 2-aminopentanethioic S-acid is critical for the achievement of the therapeutic effect of 2-aminopentanethioic S-acid. Thus, the substance of formula (I) was effective in ameliorating the ALS symptoms.

Figure 2:
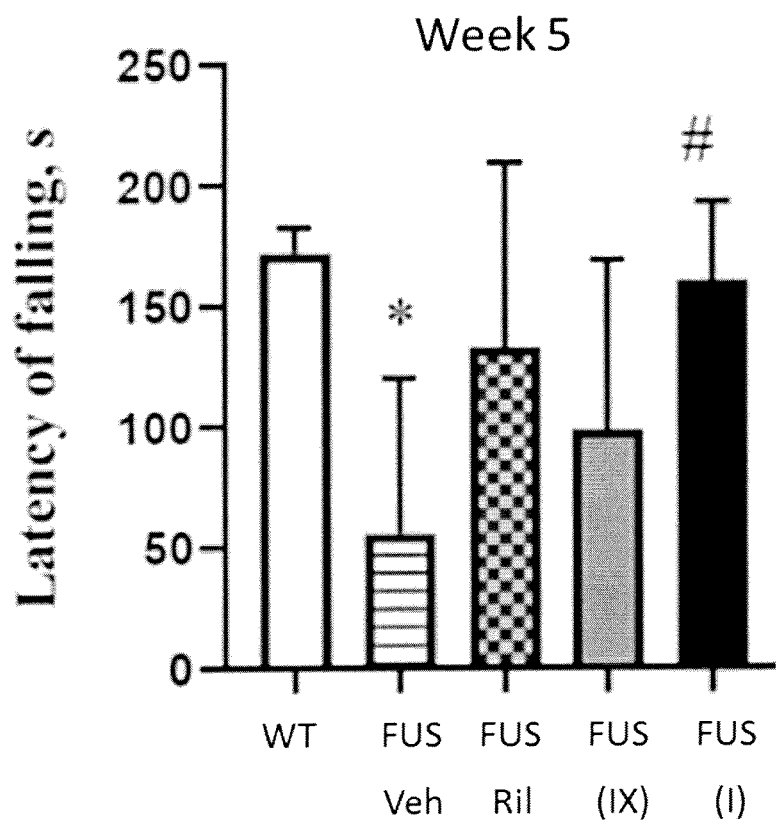
FIG. 2 shows the effects of chronic administration of the substance of formula (I) as well as Vehicle (Veh), Riluzole (Ril), and the substance of formula (IX) on the latency to fall in the rotarod test in FUS-tg mice (FUS) compared to non-treated wild-type littermates (WT). Data are presented as mean±SEMs (*$p<0.05$, vs. WT, #$p<0.05$ vs. Veh, one-way ANOVA and Tukey's test).

The motor coordination, strength and balance was recorded for each FUS-tg mouse in the rotarod test. During the period of the observations, motor behavior of FUS-tg mice was gradually declining, as reflected by the significant decrease in the latency to fall in the rotarod test in FUS-tg vehicle-treated mice in comparison with WT control on the week 5. FUS-tg mice treated with the substance (I) had significantly longer latency to fall than vehicle-treated FUS-tg mice, while there was no significant difference between FUS-tg mice treated with Riluzole and vehicle-treated FUS-tg mice as well as between FUS-tg mice treated with substance (IX) and vehicle-treated FUS-tg mice. Results are presented in FIG. 2 as mean±SEMs (*p<0.05, vs. WT, #p<0.05 vs. Veh, one-way ANOVA and Tukey's test). Thus, the substance of formula (I) was effective in ameliorating motor dysfunctions in the ALS model.

Figure 3:
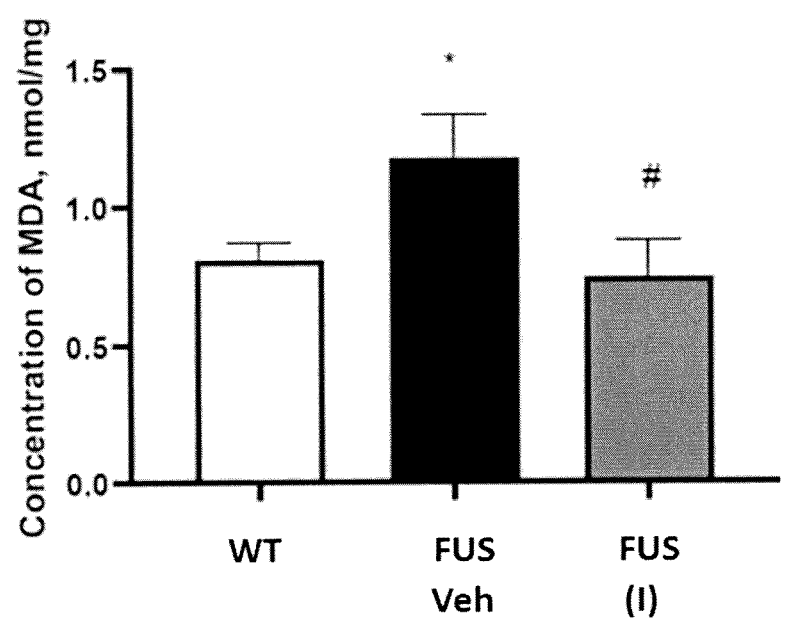
FIG. 3 shows the effects of chronic administration of the substance of formula (I) on the concentrations of malondialdehyde (MDA), a marker of oxidative stress, in the spinal cord of FUS-tg mice (FUS) compared to non-treated wild-type littermates (WT) and vehicle-treated FUS-tg mice (Veh). Data are presented as mean±SEMs (*$p<0.05$ vs. WT group; #$p<0.05$ vs. Veh group; one-way ANOVA and Tukey's test).

The concentration of malondialdehyde (MDA), a marker of oxidative stress, was measured in the spinal cord of FUS-tg mice treated with vehicle or substance of formula (I) in comparison with wild type controls. FIG. 3 shows that there was a significant difference between groups (p<0.05, one-way ANOVA and Tukey's test). MDA levels were significantly increased in FUS-tg mice as compared to WT. There was a significant reduction of the MDA levels in FUS-tg mice treated with the substance of formula (I) compared to vehicle-treated FUS-tg mice (FIG. 3; p<0.05, one-way ANOVA and Tukey's test). Thus, the substance of formula (I) was effective in ameliorating oxidative stress in spinal cord of mice with ALS symptoms.

Collectively, results of testing of the substance of formula (I) in FUS-tg ALS model, which reproduces characteristic signs of human ALS, demonstrate that the substance of formula (I) is effective in the therapy of ALS by diminishing multiple symptoms of ALS.

The invention claimed is:

1. A method of treating amyotrophic lateral sclerosis comprising administering to a subject in need thereof an effective amount of a compound of formula (I):

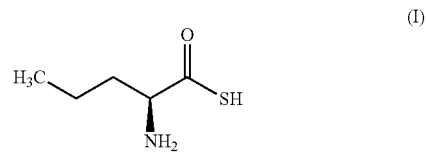

or a pharmaceutically acceptable salt thereof.

2. The method of claim 1, comprising administering to the subject an effective amount of a compound of formula (I).

3. The method of claim 1, comprising administering to the subject an effective amount of a pharmaceutically acceptable salt of a compound of formula (I).

4. The method of claim 1, wherein the pharmaceutically acceptable salt is selected from chloride, bromide, sulfate, phosphate, mesylate, acetate, pyruvate, lactate, citrate, succinate, fumarate, malate, and ketoglutarate.

5. The method of claim 1, wherein the pharmaceutically acceptable salt comprises one or more of lithium, sodium, potassium, magnesium, calcium, ammonium, and alkylammonium.

6. The method of claim 3, wherein the pharmaceutically acceptable salt comprises one or more of lithium, sodium, potassium, magnesium, calcium, ammonium, and alkylammonium.

7. The method of claim 1, wherein the subject is a human.

8. The method of claim 1, wherein the compound of formula (I) or the pharmaceutically acceptable salt thereof is formulated in an orally acceptable dosage form.

9. The method of claim 1, wherein the compound of formula (I) or the pharmaceutically acceptable salt thereof is formulated in an injectable dosage form.

10. The method of claim 1, wherein the compound of formula (I) or the pharmaceutically acceptable salt thereof is formulated in an inhalation dosage form.

11. The method of claim 1, wherein the compound of formula (I) or the pharmaceutically acceptable salt thereof is formulated in an intranasal dosage form.

12. The method of claim 1, wherein the compound of formula (I) or the pharmaceutically acceptable salt thereof is formulated in a rectal dosage form.

13. The method of claim 4, wherein the compound of formula (I) or the pharmaceutically acceptable salt thereof is formulated in an orally acceptable dosage form.

14. The method of claim 4, wherein the compound of formula (I) or the pharmaceutically acceptable salt thereof is formulated in an injectable dosage form.

15. The method of claim 4, wherein the compound of formula (I) or the pharmaceutically acceptable salt thereof is formulated in an inhalation form.

16. The method of claim 4, wherein the compound of formula (I) or the pharmaceutically acceptable salt thereof is formulated in an intranasal dosage form.

17. The method of claim 4, wherein the compound of formula (I) or the pharmaceutically acceptable salt thereof is formulated in a rectal dosage form.

* * * * *